(12) United States Patent
Lapôtre et al.

(10) Patent No.: US 12,571,655 B2
(45) Date of Patent: Mar. 10, 2026

(54) BRAKE LINING WEAR SENSOR

(71) Applicant: SAFRAN ELECTRONICS & DEFENSE, Paris (FR)

(72) Inventors: Blaise Lapôtre, Moissy-Cramayel (FR); Jérôme Piaton, Moissy-Cramayel (FR); Mehdi Besseghair, Moissy-Cramayel (FR); Maxime Bisson, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 147 days.

(21) Appl. No.: 18/576,617

(22) PCT Filed: Jul. 5, 2022

(86) PCT No.: PCT/EP2022/068644
§ 371 (c)(1),
(2) Date: Jan. 4, 2024

(87) PCT Pub. No.: WO2023/280882
PCT Pub. Date: Jan. 12, 2023

(65) Prior Publication Data
US 2024/0328826 A1     Oct. 3, 2024

(30) Foreign Application Priority Data
Jul. 5, 2021     (FR) ...................................... 2107254

(51) Int. Cl.
*G01D 5/14*     (2006.01)
*B60T 8/17*     (2006.01)
(Continued)

(52) U.S. Cl.
CPC .............. *G01D 5/145* (2013.01); *B60T 17/22* (2013.01); *B64D 45/00* (2013.01); *B60T 8/1703* (2013.01); *B64D 2045/0085* (2013.01)

(58) Field of Classification Search
CPC ................................ G01D 5/145; B60T 17/22
See application file for complete search history.

(56) References Cited

U.S. PATENT DOCUMENTS 7,283,826 B2 * 10/2007 Dufour .................. G01D 5/147
324/207.2
2003/0197504 A1     10/2003 Gray et al.
(Continued)

FOREIGN PATENT DOCUMENTS

EP        3421834 A1     1/2019
FR        2965347 A1     3/2012
(Continued)

*Primary Examiner* — Reena Aurora
(74) *Attorney, Agent, or Firm* — MUNCY, GEISSLER, OLDS & LOWE, P.C.

(57)     ABSTRACT
A position sensor including a supporting structure bearing two elements capable of translational movement relative to one another in a first direction, namely a magnetic-field-emitting element for generating a magnetic field, and a magnetic-field-detecting element. The magnetic-field-emitting element is arranged in such a way that an orientation of the magnetic field, which orientation is considered in a first plane orthogonal to the first direction, changes as a function of a distance separating the first plane from a first end of the magnetic-field-emitting element. The magnetic-field-detecting element is configured to produce a signal indicative of the orientation of the magnetic field. A brake and an aircraft are equipped with the position sensor.

12 Claims, 9 Drawing Sheets

(51) Int. Cl.
    *B60T 17/22*        (2006.01)
    *B64D 45/00*        (2006.01)

(56)        References Cited

U.S. PATENT DOCUMENTS

| | | | |
|---|---|---|---|
| 2013/0113469 A1 | 5/2013 | Wallrafen | |
| 2020/0149924 A1 | 5/2020 | Welsch et al. | |
| 2021/0088603 A1* | 3/2021 | Bidaux | ................. G01R 33/02 |

FOREIGN PATENT DOCUMENTS

| | | |
|---|---|---|
| FR | 3068098 | 12/2018 |
| WO | WO0151893 A1 | 7/2001 |
| WO | WO2020188367 A1 | 9/2020 |

* cited by examiner

BRAKE LINING WEAR SENSOR

The present invention relates to the field if linear movement sensors, and more specifically, sensors for measuring wear of linings of an aircraft brake.

BACKGROUND OF THE INVENTION

The brakes of modern aircraft wheels comprise a disc stack (also called heat well) comprising rotor discs rotatably linked to the wheel and stator brakes rotatably linked to the axis on which the wheel is mounted to pivot. These discs are pressed against one another by means of pistons or pushers, mounted on a ring, to generate a braking torque by friction, specific to slowing down the wheel. The discs are likely to wear upon each braking, and it is important to know their state of wear to be able to plan their replacement. In this regard, the brakes are generally equipped with at least one wear indicator which is slidingly mounted in a housing integral with a fixed part (for example, the ring bearing the pushers) and which is required to come into contact with the face of the disc on which the pushers exert their force, such that it moves in its housing as the discs wear. The position of the indicator with respect to its housing and to the fixed part is therefore indicative of the state of wear of the disc stack. To give an order of magnitude, the heat wells are changed typically after 2000 to 4000 landings.

Before replacement, the disc stack has lost five to six centimetres of thickness. Operators responsible for maintenance regularly check the position of the wear indicator (typically weekly) to check the state of wear of the discs, and proceed with their replacement with new discs when the wear indicator reaches a maximum wear position. Such a check is reliable, but it does not make it possible to accurately estimate the wear of the discs of the inspected brake, and makes any automated monitoring of the wear of the brake discs difficult.

To improve the monitoring of the brakes in service, it has been proposed in document FR3068098 to perform a capture of an image of the wear indicator and to proceed with an automatic analysis of the image acquired to evaluate the wear of the brakes. Such a method however requires a manual image capture of the wear indicator to be performed.

AIM OF THE INVENTION

The invention, in particular aims to facilitate operations of evaluating the wear of a brake disc stack.

SUMMARY OF THE INVENTION

To this end, a position sensor is provided, comprising a supporting structure bearing two elements capable of translational movement relative to one another in a first direction, namely a magnetic-field-emitting element for generating a magnetic field, and a magnetic-field-detecting element, the magnetic-field-emitting element being arranged in such a way that an orientation of the magnetic field, which orientation is considered in a first plane orthogonal to the first direction changes as a function of a distance separating the first plane from a first end of the magnetic-field-emitting element. The magnetic-field-detecting element is configured to produce a signal indicative of the orientation of the magnetic field. Thus, a contactless linear movement sensor is obtained between the movable element and the reference element which makes it less sensitive to vibrations. The sensor of the invention performs a reading of an orientation of a magnetic field, rather than an intensity measurement which makes it possible to improve the robustness of the measurement with respect to the heat and to the variability of the induction level linked to production.

A robust device is obtained, as with no device for mechanically converting the linear movement of the movable element, when the orientation of the magnetic field, which orientation considered in a first plane orthogonal to the first direction changes as a function of a distance separating the first plane from a first end of the magnetic-field-emitting element.

The accuracy of the sensor is improved when the magnetic-field-emitting element has a magnetic pole which helically extends around the first direction.

It is not necessary to perform a permanent reading of the sensor, when the magnetic pole extends along an angle strictly less than three hundred and sixty degrees around the first direction between two ends of the t magnetic-field-emitting element.

Advantageously, the magnetic-field-emitting element comprises a first portion of North polarity helically extending around the first longitudinal direction and a second portion of South polarity helically extending around the first direction.

The production of the magnetic-field-emitting element is facilitated when the magnetic-field-emitting element comprises a plurality of magnetic sub-elements each having a South pole and a North pole which extend on either side of the first longitudinal direction, and wherein the poles of the same polarity of two adjacent magnetic sub-elements have a non-zero angular offset measured around the first direction.

The relative positioning of two adjacent magnetic sub-elements is facilitated when the magnetic sub-elements comprise at least one groove or a plurality of grooves.

Advantageously, at least one groove is on an outer surface of the sub-element.

The manufacture of the sensor is particularly rapid when the magnetic-field-emitting element comprises a tubular sheath which has an inner surface having a ridge arranged to engage with the groove. The manufacture is particularly economical when the sheath is straight cylinder-shaped, and the magnetic sub-elements are cylinder portions, the outer surface of which is grooved.

The measuring accuracy is improved when the magnetic-field-detecting element comprises a first magnetic probe to measure an orientation of the magnetic field in a second direction and a second magnetic probe to measure an orientation of the magnetic field in a third direction.

Information processing is facilitated when the first direction and/or the second direction is orthogonal to the third direction.

Preferably, the magnetic-field-emitting element is slidingly mounted relative to the supporting structure and the magnetic-field-detecting element is fixedly mounted relative to the supporting structure.

The invention also relates to a brake of a wheel comprising a brake lining and a sensor of the abovementioned type and wherein one of the magnetic-field-emitting element and the magnetic-field-detecting element is operationally connected to the brake lining.

The invention further relates to an aircraft comprising such a braking device.

Other features and advantages of the invention will emerge upon reading the description below of particular, non-limiting embodiments of the invention.

BRIEF DESCRIPTION OF THE DRAWINGS

Reference will be made to the accompanying drawings, among which.

DETAILED DESCRIPTION OF THE INVENTION

The invention is, in this case, described in application of an aircraft wheel mounted at the end of a landing gear, said wheel comprising a hub arranged to pivot on an axis (spindle or axle) integral with the landing gear and a rim connected to the hub by a wall and arranged to bear a tyre.

Figure 1:
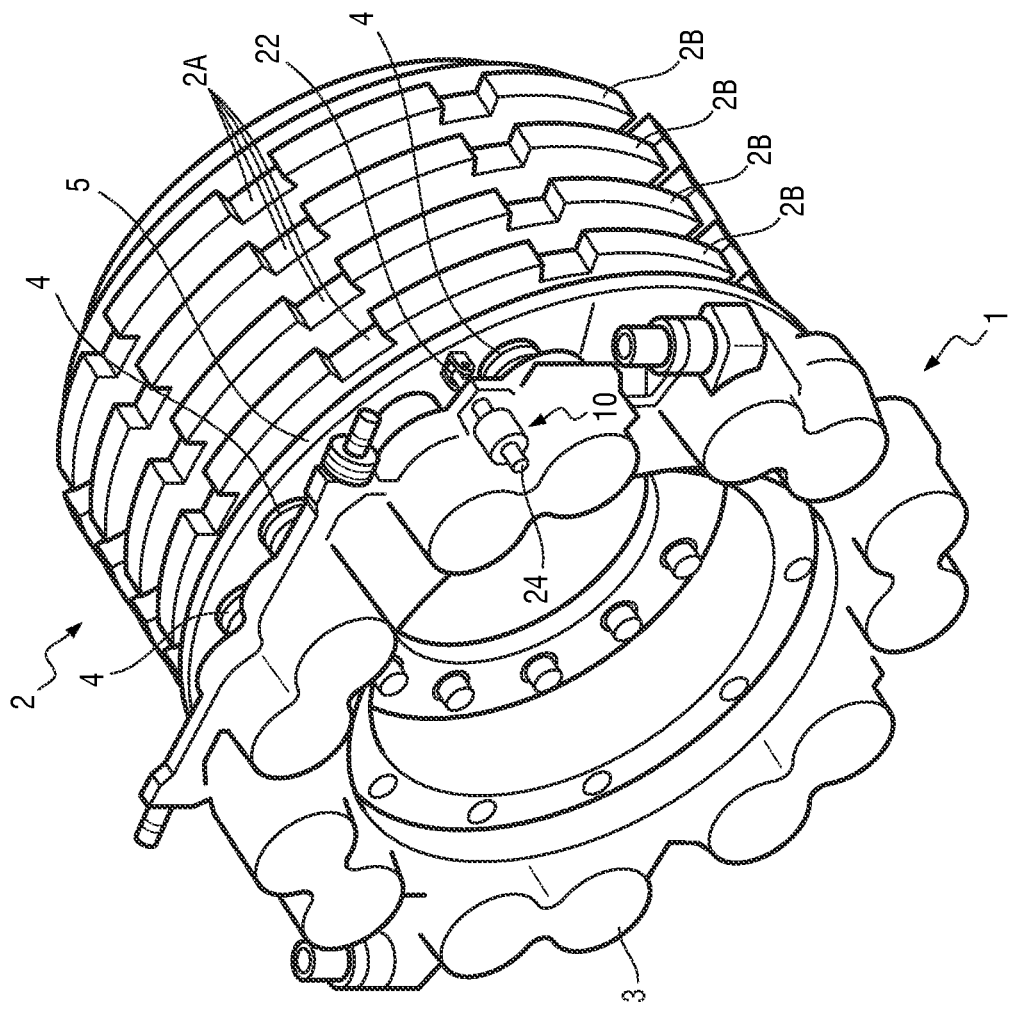
FIG. 1 is a perspective, partial, schematic view of a braking device of an aircraft wheel according to the invention.

In reference to FIG. 1, a typical aircraft wheel brake 1 comprises a twisting tube, rotatably linked relative to the axis, on which a disc stack (or heat well) 2 is mounted, comprising stator discs 2A rotatably linked to the twisting tube and rotor discs 2B rotatably linked to the wheel rim. The discs 2A, 2B are provided with braking linings. The disc stack extends between a hydraulic crown 3, fixed to an end of the twisting tube, and a rear plate fixed to the other end of the twisting tube. The hydraulic crown 3 bears pistons 4 which exert a thrust on a thrust plate 5 which axially bears on the disc stack 2 and which distributes the thrust thus exerted over the entire front surface of the disc stack 2. This well-known arrangement will not be described in more detail, and it will be noted that the invention is also applicable to an electromechanical braking device.

Figure 2:
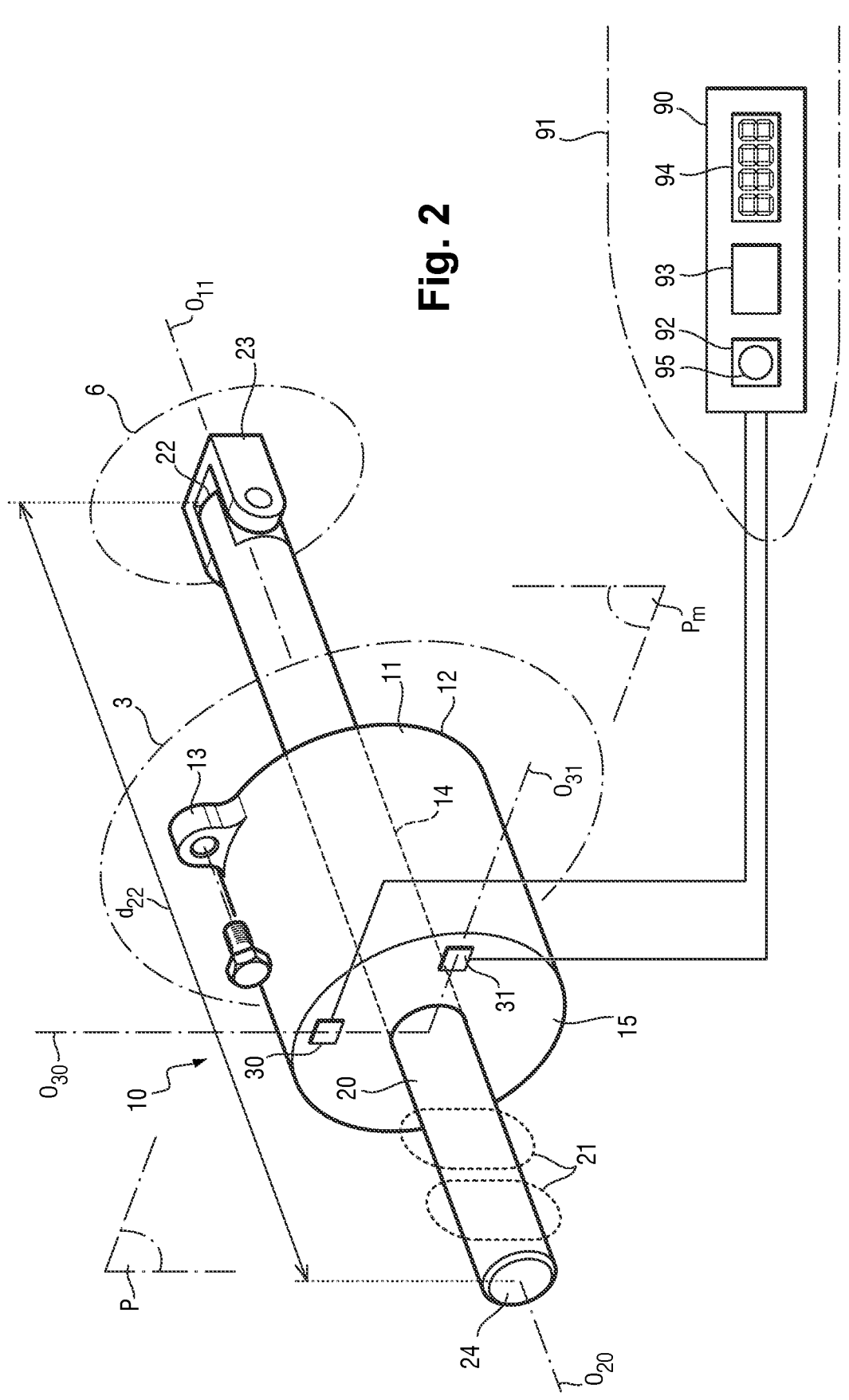
FIG. 2 is a perspective, partial, schematic view of a position sensor of the braking device.

As can be seen in FIG. 2, the brake 2 is equipped with a sensor 10, of the magnetic linear type, comprising a substantially cylindrical supporting structure 11 with a longitudinal axis O11. A lug 13 of the supporting structure is passed through by a screw engaged in an internal thread of the hydraulic crown 3 in such a way that a first face 12 of the lug 13 is applied against the hydraulic crown 3.

Figure 3:
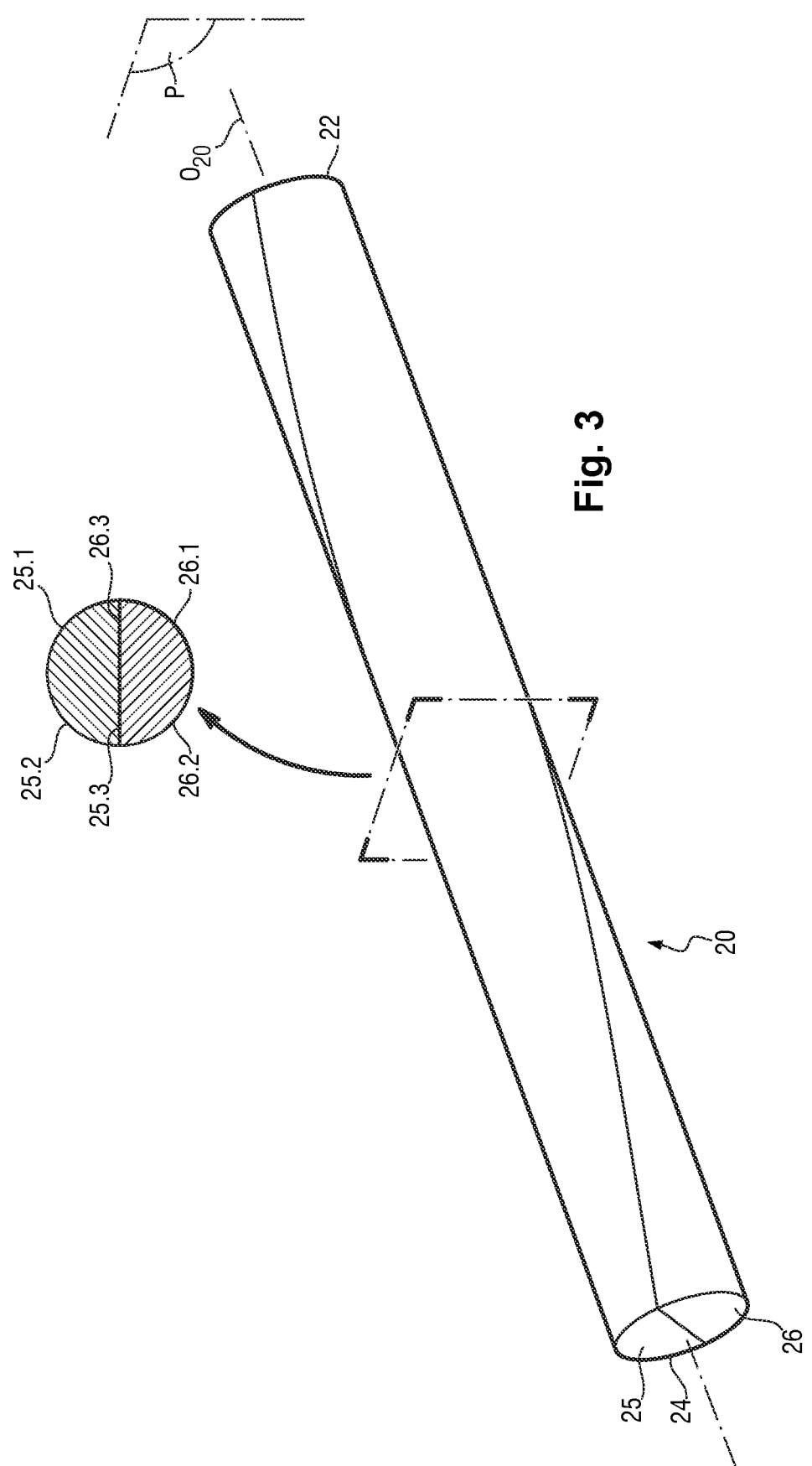
FIG. 3 is a perspective, schematic view of a magnetic-field-emitting element of the position sensor according to a first embodiment of the invention.
Figure 4:
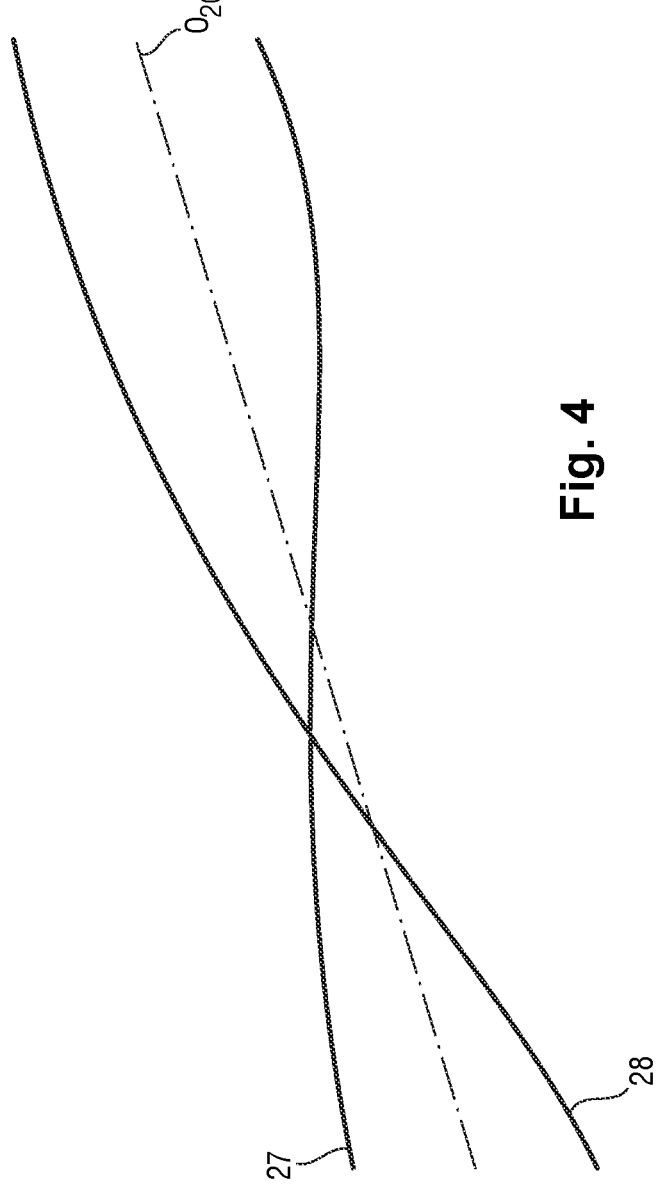
FIG. 4 is a perspective, schematic view of the orientation of the poles of the magnetic element of FIG. 3.

The sensor 10 comprises a first element constituted, in this case, of a magnetic rod 20 which is received in a bore 14 of the supporting structure 11 and extends in a first direction O20 substantially parallel to the axis O11. The magnetic rod 20 generates a radial magnetic field 21 and is slidingly mounted relative to the supporting structure 11 in the first direction O20. The magnetic rod 20 comprises a first end 22 connected to the thrust plate 6 by a pivot 23 of axis orthogonal to the direction O20, which blocks a rotation of the magnetic rod 20 around the direction O20. The second end 24 of the magnetic rod 20 is free. As can be seen in FIG. 3, the magnetic rod 20 is straight cylinder-shaped, and has a first magnetic longitudinal portion 25 and a second magnetic longitudinal portion 26.

The first longitudinal portion 25 is of North polarity and helically extends around the direction O20.

The second longitudinal portion 26 is of South polarity and helically extends around the direction O20. The first magnetic element 20 is obtained from a non-magnetised ferromagnetic material cylinder with isotropic features, which is introduced into a magnetiser, the polar parts of which helically extend. In this way, the magnetic field 21 generated by the first magnetic element 20 comprises a South pole which extends along a helix 27 around the direction O20 and along an angle of one hundred and eighty degrees around the direction O20 between the first end 22 and the second end 24 of the magnetic rod 20. The North pole of the magnetic field 21 extends along a helix 28 around the direction O20 and along an angle of one hundred and eighty degrees around the direction O20 between the first end 22 and the second end 24.

Thus, the orientation of the magnetic field 21, which is considered in the plane P orthogonal to the direction O20 changes as a function of the distance d22 separating the plane P from the first end 22.

The supporting structure 11 comprises a magnetic detection element comprising a first Hall effect-type magnetic probe 30 and a second Hall effect-type magnetic probe 31 which are positioned in one same measuring plane Pm, in this case a second face 15 of the supporting structure 11 opposite the first face 12. The second probe 31 is positioned in the plane Pm so as to correspond to an image of the first probe 30 according to a rotation of axis O11 and of amplitude of ninety degrees. The first probe 30 measures the magnetic field 21 in a second direction O30 comprised in the measuring plane Pm and which is orthogonal to the first direction O20. The second probe 31 measures the magnetic field 21 in a third direction O31 comprised in the measuring plane Pm and which is orthogonal to the first direction O20 and to the second direction O30. The first probe 30 and the second probe 31 are connected to a control unit 90 of an aircraft 91. The control unit 90 comprises a memory module 92, a processing module 93 and a display unit 94. The control unit 90 comprises, for example, a processor forming the processing module 93 and the memory module 92 contains computer programs, the execution of which by the processing module 93 enables the operation of the control unit. The memory module 92 further contains a data library 95 which associates pairs of values of the magnetic field 21 in the second direction O30 and the third direction O31 with an angular orientation of the magnetic field 21 around the first direction O20 and a position of the magnetic rod 20 relative to the supporting structure 11.

In operation, when it is sought to determine the state of wear of the braking linings of the brake 1, an output of the pistons 4 is controlled in such a way that the thrust plate 6 moves to press the disc stack 2 against the rear plate. The magnetic rod 20 moves with the thrust plate 60 to which it is attached. The processing module 93 thus reads a first orientation measurement 30.1 of the magnetic field 21 along the second direction O30 and a second orientation measurement 31.1 of the magnetic field 21 along the third direction O31. The pair of measurements 30.1 and 30.2 constitutes a signal indicative of the orientation of the magnetic field 21. The processing module 93 consults the library 95 in order to determine the angular orientation of the magnetic field 21 around the first direction O20 which is associated with the pair of values formed by the first measurement 30.1 and the second measurement 31.1. The processing module 93 thus deduces from this, a movement of the magnetic rod 20 in the first direction O20 and, thus, a wear value of the braking lining of the disc stack 2.

Thus, a reliable and rapid measurement of a state of wear of the linings of the disc stack 2 of the brake 1 is thus obtained, without it being required to perform a manual intervention on the brake 1.

Elements which are similar or analogous to those described above will bear a numerical reference identical to those in the description below of the second, third and fourth embodiments of the invention.

Figure 5:
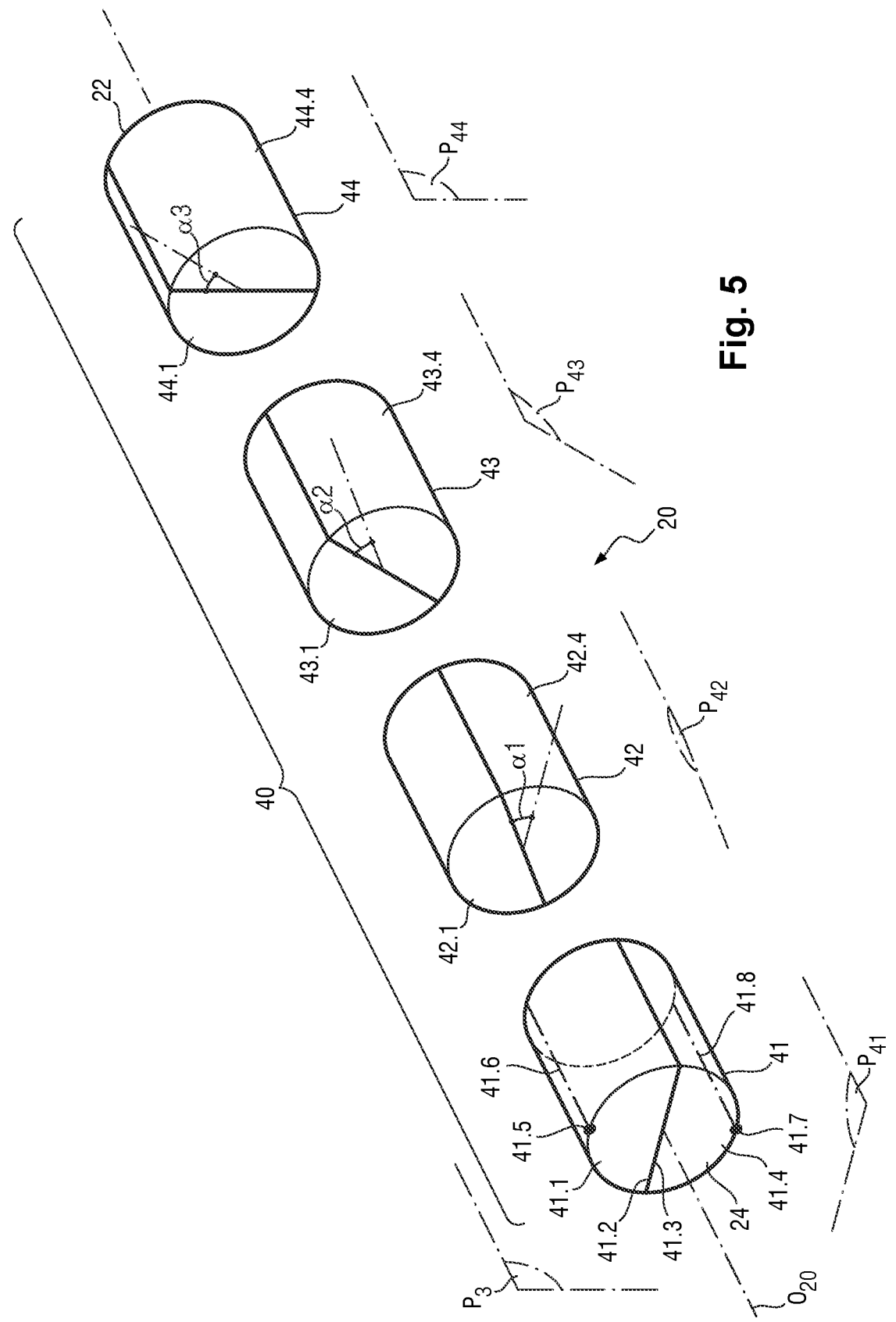
FIG. 5 is a perspective, exploded, schematic view of a magnetic-field-emitting element of the position sensor according to a second embodiment of the invention.

According to a second embodiment of the invention represented in FIG. 5, the first magnetic element 20 comprises a plurality of magnets forming magnetic sub-elements 40, among which a first sub-element 41, a second sub-element 42, a third sub-element 43 and a fourth sub-element 44.

The first sub-element 41 is straight cylinder-shaped which extends along the first direction O20 and comprises a first magnetic portion 41.1 and a second magnetic portion 41.2 located on either side of a second plane P41. The portion 41.1 is polarised so as to have a North pole 41.3 which extends according to a generator 41.4 of the portion 41.1 and which is located in a third plane P3 orthogonal to the second plane P41 and which contains the first direction O20. Correspondingly, the portion 41.2 is itself also straight half-cylinder-shaped and is polarised so as to have a South pole 41.5 which extends according to a generator 41.6 of the portion 41.4 and which is located in the third plane P3.

The second sub-element 42, the third sub-element 43 and the fourth sub-element 44 are identical to the first sub-element 41. The second sub-element 42 has a plane P42 on either side of which a North-polarised portion 42.1 and a South-polarised portion 42.2 extend. The third sub-element 43 has a plane P43 on either side of which a North-polarised portion 43.1 and a South-polarised portion 43.2 extend. The fourth sub-element 44 has a sixth plane P44 on either side of which a North-polarised portion 44.1 and a South-polarised portion 44.2 extend.

The second sub-element 42 is arranged relative to the first sub-element 41 in such a way that the fourth plane P42 forms a first angle α1 of thirty degrees in a positive direction with the second plane P41. The third sub-element 43 is arranged relative to the second sub-element 42 in such a way that the fifth plane P43 forms a second angle α2 of thirty degrees in a positive direction with the fifth plane P43. The fourth sub-element 44 is arranged relative to the third sub-element 43 in such a way that the fourth plane P42 forms a third angle α3 of thirty degrees in a positive direction with the sixth plane P44.

Thus, the South and North poles of each of the sub-elements 41 to 44 extend on either side of the first direction O20. The poles of the same polarity of two adjacent sub-elements 41 to 44 have an angular offset of thirty degrees measured around the third direction. The interactions of the magnetic fields generated by the poles of the adjacent sub-elements at the interfaces of the sub-elements 41 to 44 result in a magnetic field 21 generated by the magnetic rod 20, the South pole of which extends along a helix 27 around the first direction O20 over an angle of ninety degrees around the first direction O20 between the first end 22 and the second end 24 of the first element 20. The North pole of the magnetic field 21 also extends along a helix 28 around the first direction O20 over an angle of ninety degrees around the first direction O20 between the first end 22 and the second end 24.

Figure 6:
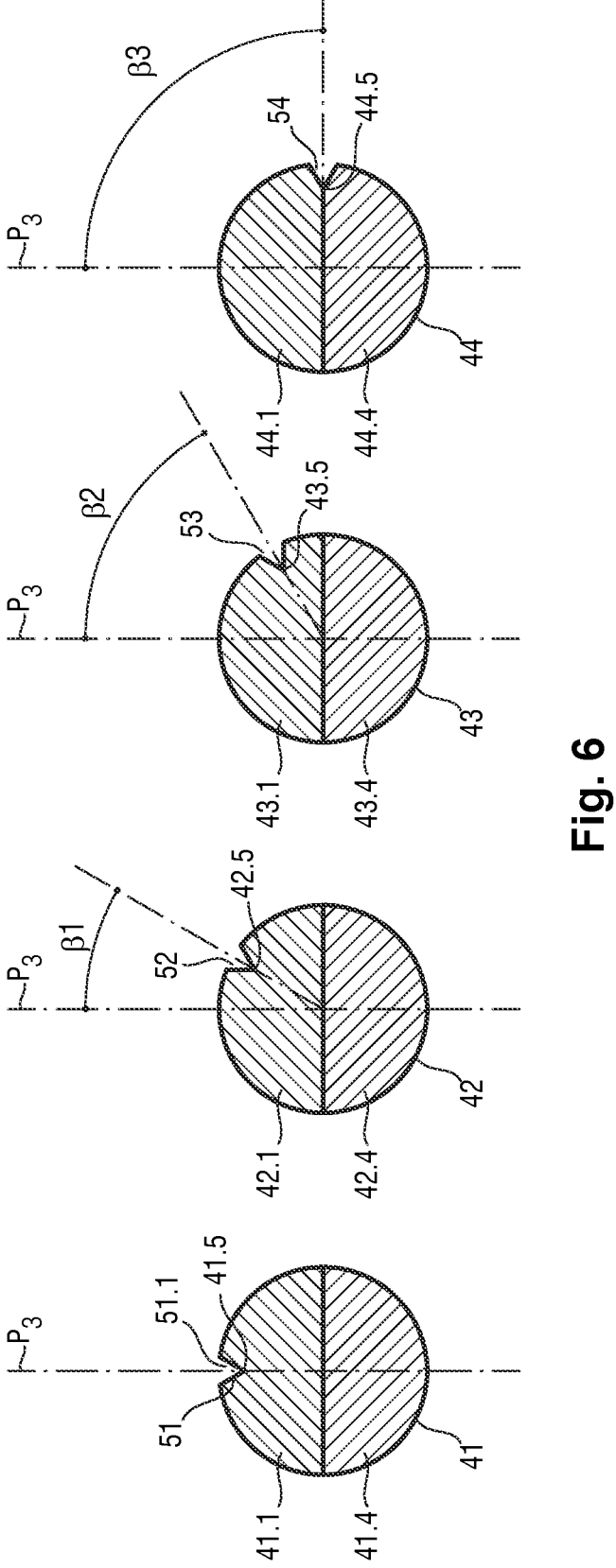
FIG. 6 is a cross-sectional view of the magnetic sub-elements of a magnetic-field-emitting element of the position sensor according to a third embodiment of the invention.

According to a third embodiment of the invention represented in FIG. 6, the first sub-element 41 comprises a groove 51, in this case of triangular cross-section 51.1, made in the curved part 25.2 and which extends according to the generator 41.6 which is located in the third plane P3. The groove 51 is made on an outer surface 41.9 of the first sub-element 41.

The second sub-element 42 comprises a groove 52 identical to the groove 51. The groove 52 extends according to a generator 42.5 which produces an angle 31 of thirty degrees in a negative direction relative to the third plane P3. The groove 52 is made on an outer surface 42.9 of the second sub-element 42.

The third sub-element 43 comprises a groove 53 identical to the groove 51. The groove 53 extends according to a generator 43.5 which produces an angle 32 of sixty degrees in a negative direction relative to the third plane P3. The groove 53 is made on an outer surface 43.9 of the third sub-element 43.

The fourth sub-element 44 comprises a groove 54 identical to the groove 51. The groove 54 extends according to a generator 44.5 which produces an angle 33 of ninety degrees in a negative direction relative to the third plane P3. The groove 54 is made on an outer surface 44.9 of the fourth sub-element 44.

Figure 7:
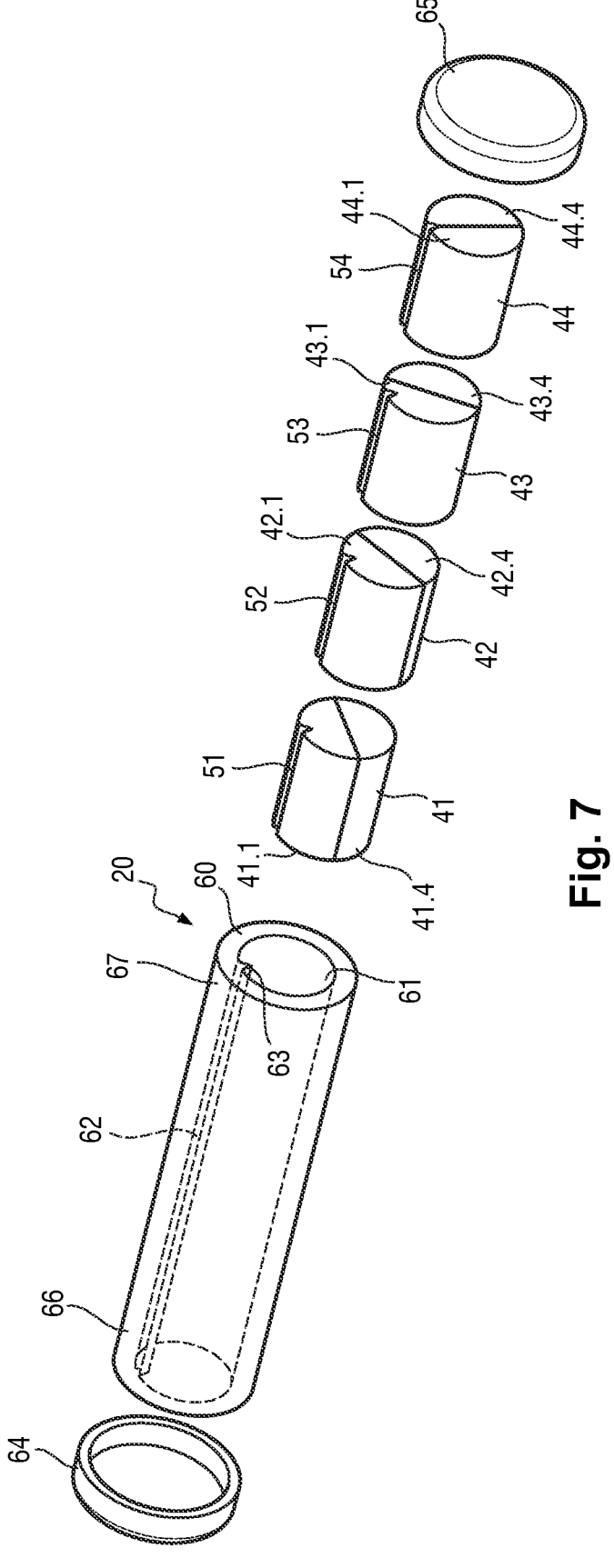
FIG. 7 is a perspective, exploded, schematic view of a magnetic-field-emitting element of the position sensor according to the third embodiment of the invention.

As can be seen in FIG. 7, the magnetic rod 20 also comprises a tubular sheath 60 which has an inner surface 61. The inner surface 61 has a ridge 62 of triangular cross-section 63 corresponding to the cross-section 51.1 and arranged to engage with the grooves 51, 52, 53 and 54. A first stopper 64 and a second stopper 65 are respectively transferred onto the first end 66 and the second end 67 of the sheath 60. In this type of mounting, the sub-elements 41 to 44 are not held in contact with one another.

The interactions of the magnetic fields generated by the poles of the sub-elements adjacent to the interfaces of the sub-elements 41 to 44 result in a magnetic field 21 generated by the first magnetic element 20 which comprises a South pole which extends along a helix around the first direction O20. The North pole of the magnetic field 21 extends along a helix around the first direction O20.

A fourth embodiment of the invention will now be described in reference to FIGS. 1, 2, 8 and 9.

The invention is, in this case, described in application to an aircraft wheel mounted at the end of a landing gear, said wheel comprising a hub arranged to pivot on an axis (spindle or axle) integral with the landing gear and a rim connected to the hub by a wall and arranged to bear a tyre.

In reference to FIG. 1, a typical aircraft wheel brake 1 comprises a twisting tube, rotatably linked relative to the axis, on which a disc stack (or heat well) 2 is mounted, comprising stator discs 2A rotatably linked to the twisting tube and rotor discs 2B rotatably linked to the wheel rim. The discs 2A, 2B are provided with braking linings. The disc stack extends between a hydraulic serrated wheel 3, fixed to an end of the twisting tube, and a rear plate fixed to the other end of the twisting tube. The hydraulic serrated wheel 3 bears pistons 4 which exert a thrust on a thrust plate 5, which axially bears on the disc stack 2 and which distributes the thrust thus exerted over the entire front surface of the disc stack 2. This well-known arrangement will not be described in more detail, and it will be noted that the invention is also applicable to an electromechanical braking device.

As can be seen in FIG. 2, the brake 1 is equipped with a sensor 10, of the magnetic linear type, comprising a substantially cylindrical supporting structure 11 of longitudinal axis O11. A lug 13 of the supporting structure 11 is passed through by a screw engaged in an internal thread of the hydraulic serrated wheel 3 in such a way that a first face 12 of the lug 13 is applied against the hydraulic serrated wheel 3.

The sensor 10 comprises a first element, in this case constituted of a magnetic rod 20 which is received in a bore 14 of the supporting structure 11 and extends in a first direction O20 substantially parallel to the axis O11. The magnetic rod 20 generates a radial magnetic field 21 and is slidingly mounted relative to the supporting structure 11 in the first direction O20. The magnetic rod 20 comprises a first end 22 connected to the thrust plate 6 by a pivot 23 of axis orthogonal to the direction O20, which blocks a rotation of the magnetic rod 20 around the direction O20. The second end 24 of the magnetic rod 20 is free.

Figure 9:
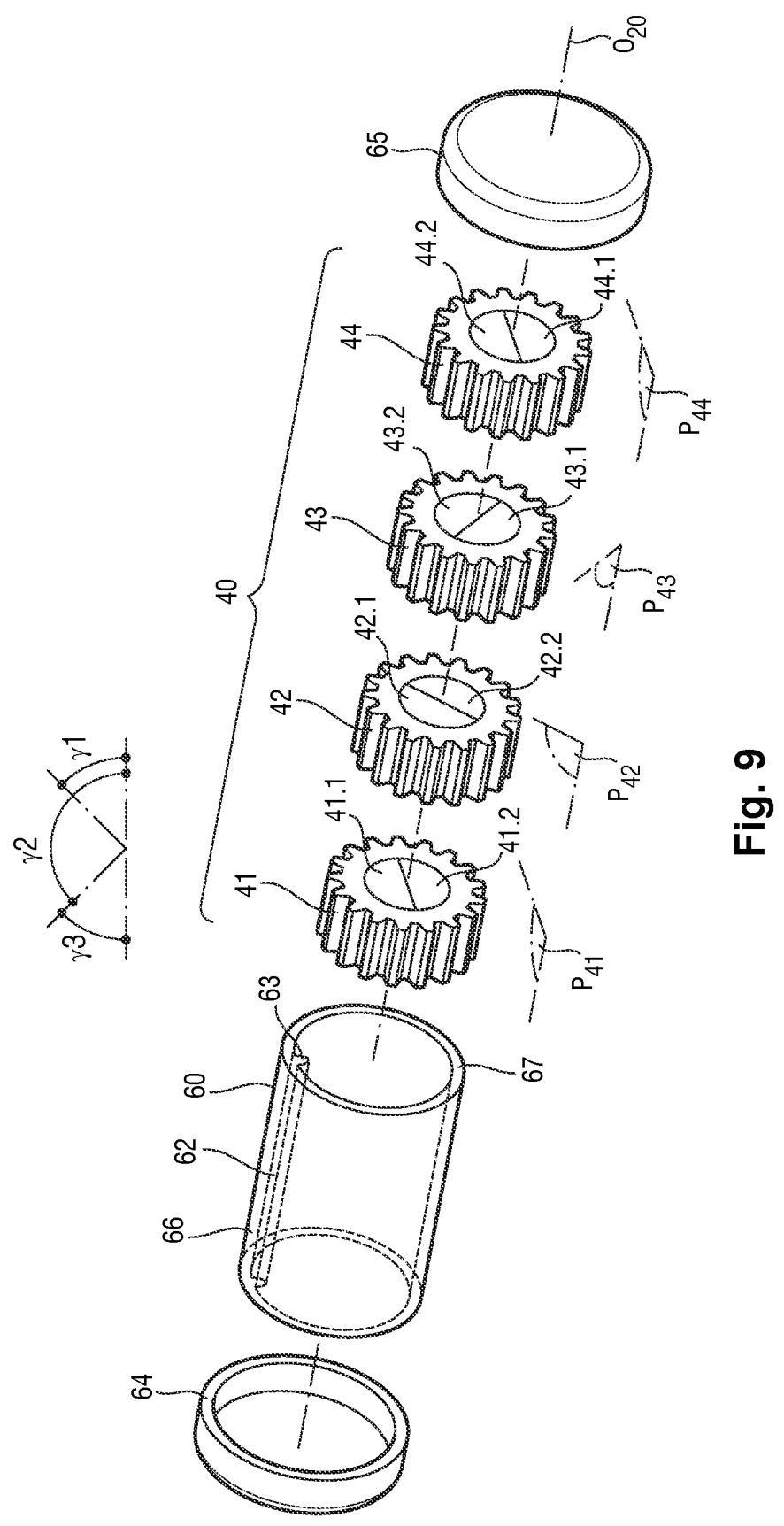
FIG. 9 is a perspective, exploded, schematic view of a magnetic-field-emitting element of the position sensor according to the fourth embodiment of the invention.

In this fourth embodiment, in reference to FIG. 9, the first magnetic element 20 comprises a plurality of magnetic sub-elements 40 among which a first sub-element 41, a second sub-element 42, a third sub-element 43 and a fourth sub-element 44.

Figure 8:
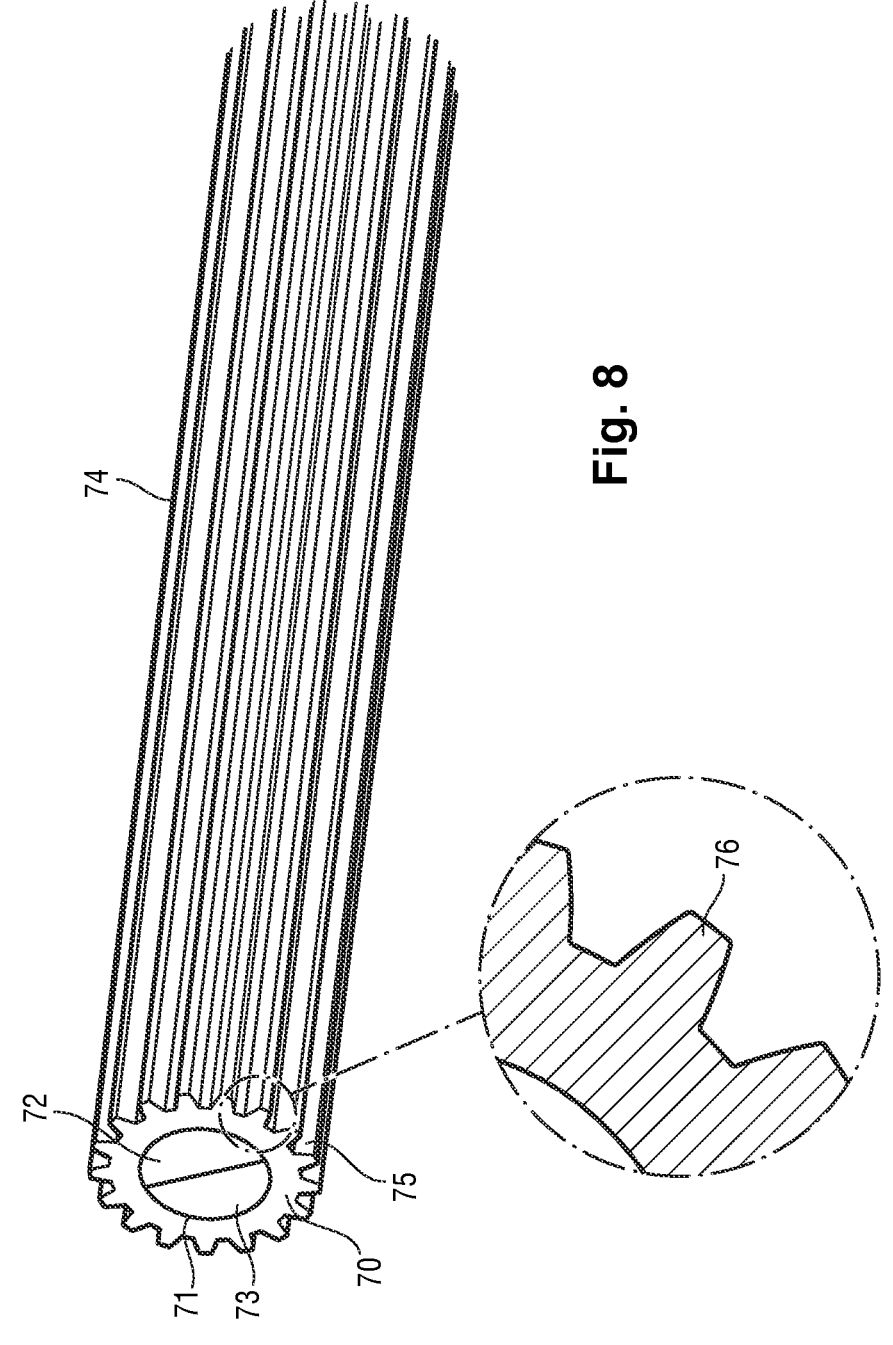
FIG. 8 is a perspective, schematic view of a magnetic-field-emitting-element of the position sensor according to a fourth embodiment of the invention.

As can be seen in FIG. 8, the magnetic sub-elements 41 to 44 are, for example, made from an elastomer sleeve 70 (or any other non-magnetic material) extruded around a cylindrical core 71 composed of a half-cylinder-shaped portion 72 of North polarity transferred onto a half-cylinder-shaped portion 73 of South polarity. The sleeve 70 has a fluted outer surface 74 which defines a plurality of grooves 75. The grooves 75 have a cross-section 76. The assembly constituted of the sleeve 70 and of the core 71 is cut in sections which respectively form the first sub-element 41, the second sub-element 42, the third sub-element 43 and the fourth sub-element 44.

Thus, each sub-element comprises a core surrounded by a serrated wheel ring. The core forms a magnet, while the ring forms a non-magnetic positioner. The core is straight cylinder-shaped extending in the first direction O20 and the serrated wheel ring surrounds the core by extending coaxially to that in the first direction O20.

Each core is represented in FIG. 8 as if it was constituted of two distinct parts. This is a schematic representation to facilitate the understanding of the operation of the sensor. In reality, each core is formed of one single part, i.e. each core is of one single block. Due to the core being magnetic, it necessarily has two poles which are schematically symbolised by two different portions in FIG. 8.

The first sub-element 41 thus comprises a first magnetic portion 41.1 forming a North pole and a second magnetic portion 41.2 forming a South pole located on either side of a second plane P41.

The second sub-element 42, the third sub-element 43 and the fourth sub-element 44 are identical to the first sub-element 41. The second sub-element 42 has a plane P42 on either side of which a North-polarised portion 42.1 and a South-polarised portion 42.2 extend. The third sub-element 43 has a plane P43 on either side of which a North-polarised portion 43.1 and a South-polarised portion 43.2 extend. The fourth sub-element 44 has a sixth plane P44 on either side of which a North-polarised portion 44.1 and a South-polarised portion 44.2 extend.

The second sub-element 42 is arranged relative to the first sub-element 41 in such a way that the fourth plane P42 forms a first angle α1 of thirty degrees in a positive direction with the second plane P41. The third sub-element 43 is arranged relative to the second sub-element 42 in such a way that the fifth plane P43 forms a second angle α2 of thirty degrees in a positive direction with the fifth plane P43. The fourth sub-element 44 is arranged relative to the third sub-element 43 in such a way that the fourth plane P42 forms a third angle α3 of thirty degrees in a positive direction with the sixth plane P44.

Thus, the South and North poles of each of the sub-elements 41 to 44 extend on either side of the first direction O20. The poles of the same polarity of two adjacent sub-elements 41 to 44 have an angular offset of thirty degrees measured around the third direction. The interactions of the magnetic fields generated by the poles of the adjacent sub-elements at the interfaces of the sub-elements 41 to 44 result in a magnetic field 21 generated by the magnetic rod 20, the South pole of which extends along a helix 27 around the first direction O20 over an angle of ninety degrees around the first direction O20 between the first end 22 and the second end 24 of the first element 20. The North pole of the magnetic field 21 also extends along a helix 28 around the first direction O20 over an angle of ninety degrees around the first direction O20 between the first end 22 and the second end 24.

Once again, each core of the sub-elements is made of one single block, i.e. that the two portions of each core are one single and same part. The symbolic separation of each core into two portions is only there to actually understand the magnetic phenomena within the sensor.

As can be seen in FIG. 9, the magnetic rod 20 comprises a tubular sheath 60 which has an inner surface 61. The inner surface 61 has a ridge 62 (like, for example, a ridge of triangular cross-section 63), corresponding to the cross-section 76, and arranged to engage with the grooves 75. A first stopper 64 and a second stopper 65 are respectively transferred onto the first end 66 and the second end 67 of the sheath 60.

As can be seen in FIG. 9, the first sub-element 41 is engaged in the sheath 60 in such a way that the second plane P41 is oriented horizontally (according to the representation of FIG. 8). One of the grooves 75 of the first sub-element 41 engages with the ridge 62 and rotatably blocks the first sub-element 41 around the first direction O20. The second sub-element 42 is then engaged in the sheath 60 in such a way that the fourth plane P42 produces an angle γ1 of forty-five degrees with the second plane P41. One of the grooves 75 of the second sub-element 42 engages with the ridge 62 and rotatably blocks the second sub-element 42 around the first direction O20, thus guaranteeing the relative angular positioning between the first sub-element 41 and the second sub-element 42. The third sub-element 43 and the fourth sub-element 44 are themselves also engaged in the sheath 60 in such a way that the fifth plane P43 produces an angle γ2 of ninety degrees with the fourth plane P42 and in such a way that the sixth plane P44 produces an angle γ3 of forty-five degrees with the fifth plane P43. The grooves 75 of the third sub-element 43 and fourth sub-element 44 engage with the ridge 62 and rotatably block the third sub-element 43 and fourth sub-element 44 around the first direction O20. The first stopper 64 and the second stopper 65 are respectively transferred onto the first end 66 and the second end 67 of the sheath 60.

A magnetic field 21 generated by the first magnetic element 20 is obtained, which comprises a South pole which extends along a helix around the first direction O20 and a North pole which also extends along a helix around the first direction O20.

In this type of mounting, the sub-elements 41 to 44 are not held in contact with one another.

Indeed, the sub-elements 41 to 44 are arranged in the sheath 60 following one another. Naturally, the sub-elements 41 to 44 will thus be repelled from one another. In this way, the sub-elements 41 to 44 are spaced apart from one another in the first direction O20.

Subsequently, each sub-element is rotatably blocked around the first direction O20 in the sheath 60 mechanically by the engagement of the ridge 62 with the grooves 75. Moreover, optionally apart from the end sub-elements, the sub-elements are not mechanically blocked in translation along the first direction O20 with respect to the sheath 60, however the magnetic interaction with the adjacent sub-elements limits this translation.

In this way, the sub-elements are not in contact with one another (along the first direction O20).

This makes it possible to be able to more easily arrange the sub-elements in the sheath 60.

A discontinuity of the first magnetic element 20 thus occurs.

At least one of the end sub-elements is mechanically blocked in translation, at least in a translation direction, along the first direction O20 with respect to the sheath 60 by the presence of the stopper which is attached to it.

For example, at least one of the end sub-elements is mechanically blocked in translation, in one single translation direction, along the first direction O20 with respect to the sheath 60 by the presence of the stopper which is attached to it (the stopper simply blocking the translation when the end sub-element abuts against it). The magnetic interaction with the sub-element which is immediately adjacent to it will moreover limit its translation along the first direction O20 with respect to the sheath 60 in the second translation direction.

In the present case, the sub-element 41 is blocked by the stopper 64 and the sub-element 44 by the stopper 65. Thus, none of the sub-elements are fixed neither to the sheath 60 nor to the adjacent sub-elements.

In a variant, at least one of the end sub-elements is mechanically blocked in translation, in both translation directions, along the first direction O20 with respect to the sheath 60 by the presence of the stopper which is attached to it. For example, at least one of the two end sub-elements is fixed to the sheath 60 so as to be integral with the sheath 60. For example, one of the two end sub-elements is fixed to one of the stoppers of the sheath 60, for example by adhering, screwing, welding, etc.

For example, the sub-element 41 is fixed to the stopper 64 and the sub-element 44 to the stopper 65. However, none of the other sub-elements is fixed neither to the sheath 60, nor to the adjacent sub-elements.

In reference to FIG. 1, the supporting structure 11 comprises a magnetic detection element comprising a first Hall effect-type magnetic probe 30 and a second Hall effect-type magnetic probe 31, which are positioned in one same measuring plane Pm, in this case, a second face 15 of the supporting structure 11 opposite the first face 12. The second probe 31 is positioned in the plane Pm correspondingly to an image of the first probe 30 about a rotation of axis O11 and of amplitude of ninety degrees. The first probe 30 measures the magnetic field 21 in a second direction O30 comprised in the measuring plane Pm and which is orthogonal to the first direction O20. The second probe 31 measures the magnetic field 21 in a third direction O31 comprised in the measuring plane Pm and which is orthogonal to the first direction O20 and to the second direction O30. The first probe 30 and the second probe 31 are connected to a control unit 90 of an aircraft 91. The control unit 90 comprises a memory module 92, a processing module 93 and a display unit 94. The control unit 90 comprises, for example, a processor forming the processing module 93 and the memory module 92 contains computer programs, the execution of which by the processing module 93 enable the operation of the control unit. The memory module 92 further contains a data library 95 which associates pairs of values of the magnetic field 21 in the second direction O30 and the third direction O31 with an angular orientation of the magnetic field 21 around the first direction O20 and a position of the magnetic rod 20 relative to the supporting structure 11.

In operation, when it is sought to determine the state of wear of the braking linings of the brake 1, an output of the pistons 4 is controlled, so that the thrust plate 6 moves to press the disc stack 2 against the rear plate. The magnetic rod 20 moves with the thrust plate 6 to which it is attached. The processing module 93 thus reads a first orientation measurement 30.1 of the magnetic field 21 in the second direction O30 and a second orientation measurement 31.1 of the magnetic field 21 in the third direction O31. The pair of measurements 30.1 and 30.2 constitutes s a signal indicative of the orientation of the magnetic field 21. The processing module 93 consults the library 95 in order to determine the angular orientation of the magnetic field 21 around the first direction O20 which is associated with the pair of values formed by the first measurement 30.1 and the second measurement 31.1. The processing module 93 thus deduces from this, a movement of the magnetic rod 20 in the first direction O20 and, thus, a wear value of the braking lining of the disc stack 2.

Thus, a reliable and rapid measurement of a state of wear of the linings of the disc stack 2 of the brake 1 is obtained, without it being required to perform a manual intervention on the brake 1.

Naturally, the invention is not limited to the embodiments described, but includes any variant entering into the field of the invention.

In particular, although, in this case, the magnetic-field-emitting element is connected to the brake lining by way of a pivot integral with the thrust plate, the invention also applies to other means for operationally connecting the magnetic-field-emitting element to the brake lining, like for example, a thrust spring, ensuring a contact of the magnetic-field-emitting element on the thrust plate;

although, in this case, the first portion of the magnetic-field-emitting element has a semi-circular-shaped cross-section, the invention also applies to other types of cross-section, such as square, rectangle, triangular, semi-oval-shaped, or any shaped cross-sections. The same applies for all of the cross-sections of the elements constituting the magnetic-field-emitting element;

although, in this case, the sensor comprises a first magnetic probe and a second magnetic probe to measure the magnetic field in two distinct directions, the invention also applies to a different number of probes, one single probe or more than two probes, and to any detector capable of measuring the orientation of the magnetic field;

although, in this case, the first portion and the second portion of the magnetic-field-emitting element are assembled to one another by adhering, the invention also applies to other assembly modes, such as welding or screwing;

although, in this case, four adjacent magnetic sub-elements have been described, arranged so that their joining planes have an angular offset of fifteen, thirty, forty-five or ninety degrees, and the joining planes of which both comprise the first direction, the invention also applies to a magnetic-field-emitting element comprising a different number of sub-elements, wherein two adjacent sub-elements, the joining planes of which have a different angular offset, strictly greater than zero and/or which do not contain the first direction;

although, in this case, the grooves are made on the outer surfaces of the magnetic sub-elements to engage with a ridge located on an inner surface of the sheath, the invention also applies to grooves made on an inner surface of the sub-elements (like for example, inside a central bore), and a ridge made on an outer surface of a bar on which the magnetic sub-elements are threaded;

although, in this case, the sheath is made by elastomer extrusion, the invention also applies to sheaths made of other materials and according to other methods, like for example, a soft iron sheath transferred by strapping;

although, in this case, the magnetic-field-emitting element generates a magnetic field, the poles of which extend along a helix and is slidingly mounted relative to the supporting structure, the invention also applies to other means for connecting the first magnetic element to the supporting structure and other arrangements of the first magnetic element, like for example, a helical connection of the first magnetic element to the supporting structure and a first magnetic element arranged to generate a radial magnetic field, the poles of which extend in a direction substantially parallel to the main direction;

although, in this case, the magnetic-field-emitting element is movably mounted relative to the supporting structure and the magnetic-field-detecting element is fixedly mounted relative to the supporting structure, the invention also applies to a magnetic-field-emitting element, fixedly mounted relative to the supporting structure and a magnetic-field-detecting element movably mounted relative to the supporting structure;

although, in this case, the poles of the magnetic-field-emitting element describe the trajectories which lead them to rotate around the first direction of between ninety and one hundred and eighty degrees, the invention also applies to poles which perform a trajectory which lead them to rotate around the first different direction of amplitude, like for example, strictly greater than zero degrees and strictly less than three hundred and sixty degrees;

although, in this case, the sensor is fixed onto the brake using a lug of its supporting structure screwed on the brake, the invention also applies to other modes of fixing the sensor to the brake, like for example adhering or clamping;

although, in this case, the probes are of the Hall effect type, the invention also applies to other types of induction measuring probes, like for example magnetoresistive or inductive probes;

although, in this case, the magnetic emitter has been described in the form of two distinct magnetic portions transferred onto one another, the invention also applies to other embodiments of the magnetic emitter, like for example a magnetic emitter made in the form of a magnetised one-piece element, in such a way that the poles describe a helix or are diametrically opposite;

although, in this case, the magnetic-emitting element comprises magnetic poles which extend along two helices, the invention also applies to other types of magnetic-emitting elements, the magnetic poles of which are arranged in such a way that the orientation of the magnetic field considered in the first plane, which orientation changes as a function of the distance separating the first plane from a first end of the magnetic-field-emitting element, like for example, a magnetic-emitting element producing a magnetic field, of which one of the poles would extend along a sinusoidal path, squared or of a complex shape which is discreet or not.

The invention claimed is:

1. A position sensor, comprising:
a supporting structure bearing two elements capable of translational movement relative to one another in a first direction, the two elements comprising: a magnetic-field-emitting element to generate a magnetic field and a magnetic-field-detecting element, the magnetic-field-emitting element being arranged in such a way that an orientation of the magnetic field, which orientation is considered in a first plane orthogonal to the first direction, changes as a function of a distance separating the first plane of a first end from the magnetic-field-emitting element, the magnetic-field-detecting element being configured to produce a signal indicative of the orientation of the magnetic field,
wherein the magnetic-field-emitting element comprises a plurality of magnetic sub-elements each having a South pole and a North pole extending on either side of the first longitudinal direction, and
wherein the poles of the same polarity of two adjacent magnetic sub-elements have a non-zero angular offset measured around the first direction, the magnetic sub-elements each comprising at least one groove on an outer surface of the magnetic sub-elements enabling their relative positioning around the first longitudinal direction.

2. The position sensor according to claim 1, wherein the sub-elements are not held in contact with one another.

3. The position sensor according to claim 1, wherein at least one of the sub-elements comprises a magnetic core surrounded by a non-magnetic ring.

4. The position sensor according to claim 3, wherein the non-magnetic ring is shaped in a serrated wheel.

5. The position sensor according to claim 1, wherein the magnetic sub-elements comprise a plurality of grooves.

6. The position sensor according to claim 1, wherein the magnetic-field-emitting element comprises a tubular sheath which has an inner surface having a ridge arranged to engage with the at least one groove.

7. The position sensor according to claim 6, wherein the tubular sheath is straight cylinder-shaped, and the magnetic sub-elements are cylinder portions, the outer surface of which is grooved.

8. The position sensor according to claim 1, wherein the magnetic-field-detecting element comprises:
a first magnetic probe to measure an orientation of the first magnetic field in a second direction; and
a second magnetic probe to measure an orientation of the first magnetic field in a third direction.

9. The position sensor according to claim 8, wherein the first direction and/or the second direction is orthogonal to the third direction.

10. The position sensor according to claim 1, wherein the magnetic-field-emitting element is slidingly mounted relative to the supporting structure and the magnetic-field-detecting element is fixedly mounted relative to the supporting structure.

11. A brake of a wheel comprising:

a brake lining; and a sensor according to claim 1, wherein one of the magnetic-field-emitting element and the magnetic-field-detecting element is operationally connected to the brake lining.

12. An aircraft comprising a landing gear having at least one wheel provided with the brake according to claim 11.

\* \* \* \* \*